United States Patent [19]

Rilly et al.

[11] Patent Number: 4,864,485
[45] Date of Patent: Sep. 5, 1989

[54] SWITCHED MODE POWER SUPPLY WITH START-UP CONTROL

[75] Inventors: Gerard Rilly, Unterkirnach; José Rodriguez, VS-Villingen, both of Fed. Rep. of Germany

[73] Assignee: Deutsche Thomson-Brandt GmbH, Villingen-Schwenningen, Fed. Rep. of Germany

[21] Appl. No.: 250,194

[22] Filed: Sep. 28, 1988

[30] Foreign Application Priority Data

Sep. 29, 1987 [DE] Fed. Rep. of Germany ....... 3732790

[51] Int. Cl.$^4$ ............................................. H02M 3/335
[52] U.S. Cl. ......................................... 363/49; 363/21; 363/56; 363/97
[58] Field of Search ................................... 363/19–21, 363/49, 56, 97, 131; 323/901

[56] References Cited

U.S. PATENT DOCUMENTS

| | | | |
|---|---|---|---|
| 4,063,307 | 12/1977 | Stephens | 363/21 |
| 4,459,651 | 7/1984 | Fenter | 363/49 |
| 4,586,120 | 4/1986 | Malik et al. | 363/49 |
| 4,692,852 | 9/1987 | Hoover | 363/21 |
| 4,761,723 | 8/1988 | Lendaro | 363/49 |
| 4,763,238 | 8/1988 | Maige | 363/49 |

Primary Examiner—Peter S. Wong
Attorney, Agent, or Firm—Eugene M. Whitacre; Joseph J. Laks; Harvey D. Fried

[57] ABSTRACT

In a switched mode power supply, an output switch is coupled to the primary winding of a transformer and to an input supply voltage derived from the AC mains voltage. A driver stage is coupled to the output switch and to a switched control voltage for producing on-off switching of the output switch between conduction and cutoff to generate a pulse voltage in a secondary winding of the transformer. A supply circuit including a rectifier is coupled to the pulse voltage for generating an operating voltage. A control circuit, responsive to the feedback of the output voltage, modulates the control voltage in a manner that varies the on-off switching of the output switch to stabilize the operating voltage. A bias voltage, derived from the AC mains voltage, and available during a startup interval of the power supply, is coupled to the driver stage during the startup interval. The bias voltage inhibits conduction of the output switch until sufficient time has elapsed after initiation of startup to enable the control circuit to generate a control voltage that is adequate to safely produce the on-off switching of the output switch.

19 Claims, 1 Drawing Sheet

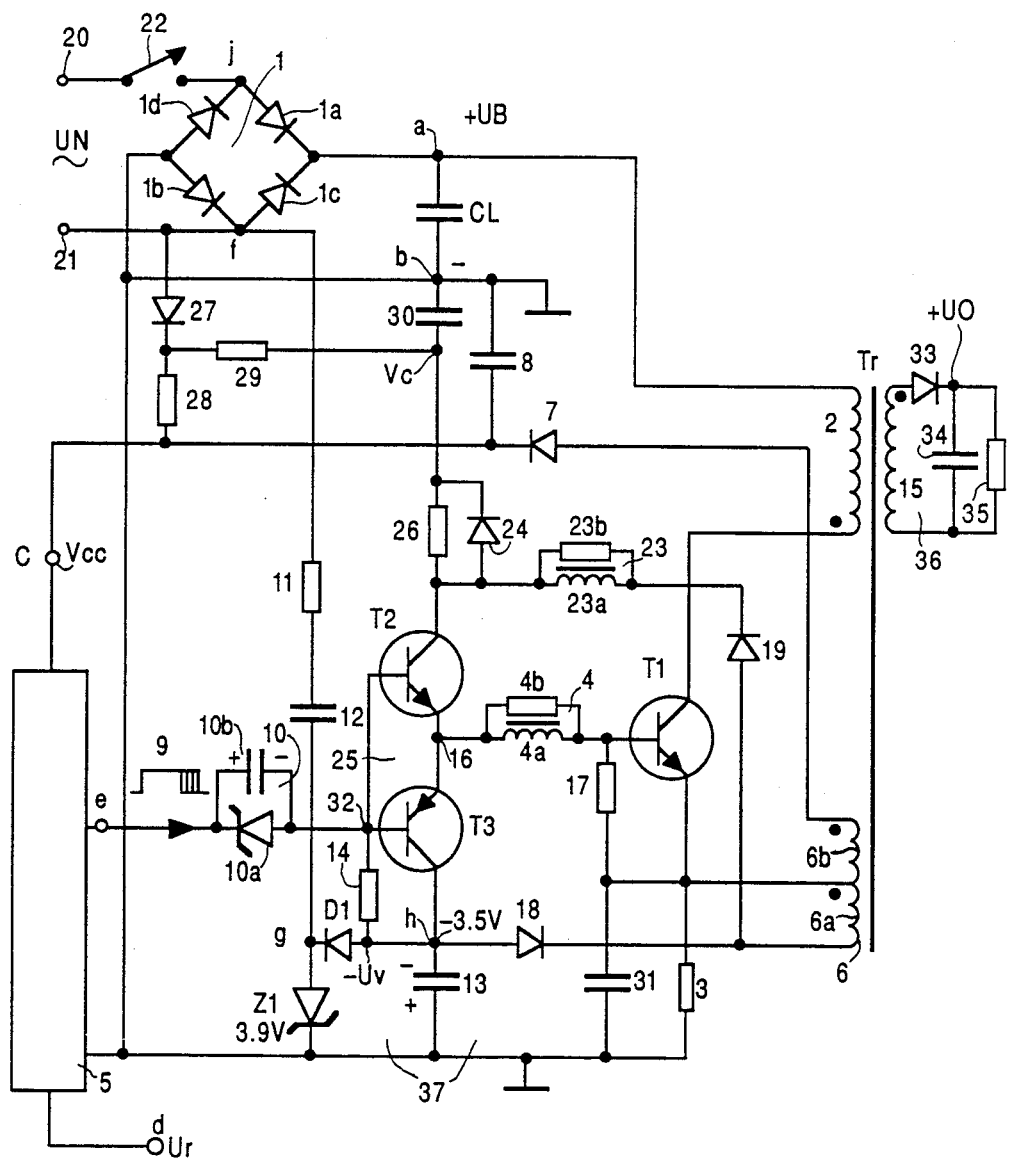

SWITCHED MODE POWER SUPPLY WITH START-UP CONTROL

This invention relates to a switched mode power supply.

BACKGROUND

A switched mode power supply may include a switching transistor which is coupled to the primary winding of a transformer and to a DC input voltage derived from the AC mains supply. The switching transistor is periodically switched between conduction and cutoff by a control voltage developed by a control circuit. The control voltage may be pulse width modulated, the modulation being a function of the amplitude of the generated operating voltage at the secondary side of the transformer. The modulation is such that the conduction interval or on-time of the switching transistor is modified so as to stabilize the output voltage.

During the on-time of the switching transistor, magnetic energy is stored in the transformer from the input voltage in the form of an upramping current flowing in the primary winding of the transformer. After the switching transistor is cutoff, this stored magnetic energy is transferred via induced voltage pulses to the secondary windings of the transformer. A corresponding charging current passes into the filters of the secondary side rectifier circuits.

The energy stored in the transformer is discharged into the secondary side rectifier circuits during the off-time of the switching transistor. The off-time is terminated when the switching transistor is again switched into conduction and the transformer is again charged with magnetic energy in the form of current flowing in the primary winding.

In one form of switched mode power supply, the stored magnetic energy is discharged into the secondary side rectifier circuits during the off-time of the switching transistor until current in the transformer secondary windings decreases to zero. Thereafter, a deadtime interval commences when the switching transistor and the rectifier circuits are nonconductive. The deadtime interval is terminated when the switching transistor is again switched into the conductive state.

During a startup interval, transient startup effects within the switched mode power supply may adversely affect the ability of the control circuit to generate a control voltage that is adequate to safely produce on-off switching of the output switching transistor. For example, the control circuit may be capable of building up the control voltage to a level which can turn on the switching transistor, but which cannot adequately turn off the transistor after it has been turned on. In particular, the control circuit may undesirably permit excessively long duration on-time intervals for the switching transistor. An excessively long duration on-time permits the upramping current in the transformer primary winding to increase to an excessively large amplitude before the transistor is switched off. As a result, excessively large voltage and current pulses may be generated in the transformer windings. These pulses may be severe enough to damage components in the switched mode power supply and the loads circuits coupled thereto.

A feature of the invention is a switched mode power supply which safely makes the transition out of the startup mode of operation.

SUMMARY OF THE INVENTION

An inductance, such as a transformer, is coupled to an output switch and to a source of AC mains derived input supply voltage. A driver stage is coupled to the output switch and to a switched control voltage for producing on-off switching of the output switch between conduction and cutoff to generate the pulse voltage in the inductance. A supply circuit including a rectifier is coupled to the pulse voltage for generating an operating voltage. A control circuit generates the control voltage and is responsive to a feedback signal that is representative of the output voltage for modulating the control voltage in a manner that enables the driver stage to vary the switching of the output switch to stabilize the output voltage. A voltage generator generates a bias voltage that is available during a startup interval initiated prior to a run-mode switching operation of the switched mode power supply. The bias voltage is coupled to the driver stage during the startup interval to inhibit conduction of the output switch during the startup interval. The output switch is inhibited until sufficient time has elapsed to enable the control circuit to generate a control voltage that is adequate to safely initiate the on-off switching of the output switch.

Advantageously, the bias voltage is derived from the AC mains supply and is available at its full amplitude when the control circuit begins building up the control voltage upon initiation of the startup interval. A full amplitude bias voltage is easily achievable because, in general, relatively large time constant circuits are associated with the various supply voltage generating circuits and with the various circuits internal to the power supply control circuit. As a result, the control voltage takes a relatively long time to build up to its run-mode levels, delaying the buildup for as much as one second after initiation of the startup interval. The bias voltage, in accordance with an aspect of the invention, inhibits conduction of the output switch until the control circuit is capable of generating a control voltage amplitude that is adequate to safely initiate the on-off switching of the output switch.

BRIEF DESCRIPTION OF THE DRAWING

The sole FIGURE illustrates a switched mode power supply embodying the invention.

DETAILED DESCRIPTION OF THE INVENTION

In the sole FIGURE, a source of AC mains voltage UN, developed between terminals 20 and 21, is coupled between input terminals j and f, respectively, of a full-wave bridge rectifier 1, comprising diodes 1a-1b. A filtered DC input voltage +UB is generated between a first output terminal a of the bridge rectifier and a second output terminal b, functioning as a current return terminal, which terminal may be considered an earth or ground point. A capacitor CL provides filtering of input voltage +UB. An on-off switch 22 is coupled between AC mains voltage terminal 20 and bridge rectifier input terminal j. AC mains voltage UN is unregulated and may vary between 90 VAC and 260 VAC.

Input voltage +UB is applied to the undotted end terminal of a primary winding 2 of a switched mode power supply transformer Tr. The dotted end terminal of primary winding 2 is coupled to the collector of an output switching transistor T1. The emitter of transistor T1 is grounded via a small sampling resistor 3 that samples the current in primary winding 2. A capacitor 31 filters the current-sampled voltage developed across resistor 3. Resistor 3 provides current limiting of the current in transistor T1 to prevent too great a current from flowing and damaging the transistor. Additionally the voltage at the emitter of transistor T1, being proportional to the current in primary winding 2, may be used for controlling a short-circuit protection circuit, not shown in the FIGURE.

A secondary winding 15 of transformer Tr is coupled to a supply circuit 36 that generates a regulated DC operated voltage +U0 for supplying energy to a load circuit, schematically shown in the FIGURE as a load resistor 35. In supply circuit 36, the anode of a rectifier 33 is coupled to the dotted terminal of secondary winding 15 and the cathode is coupled to one terminal of a filter capacitor 34. The other terminal of filter capacitor 34 is coupled to the undotted terminal of the secondary winding. Load circuit 35 is coupled across capacitor 34 and is energized by the +U0 voltage which is developed across and filtered by the capacitor.

To generate the +U0 operating voltage, switching transistor T1 is pulse width modulated at a frequency that is determined in accordance with a pulse width modulated, switched controlled voltage 9 developed at an output control terminal e of a control circuit 5. Switched control voltage 9 is coupled to an input terminal 32 of a push-pull driver stage 25 via an impedance network 10, comprising a zener diode 10a in parallel with a speedup capacitor 10b.

Driver stage 25 comprises a transistor T2 and a transistor T3 having their collector-to-emitter main current paths coupled together in a push-pull configuration, where the bases of transistors T2 and T3 are coupled to input terminal 32, and the emitters are coupled to an output terminal 16 of driver stage 25. Output terminal 16 of driver stage 25 is coupled to the base of switching transistor T1 via an impedance network 23 comprising an inductor 23a in parallel with a resistor 23b. A resistor 17 is coupled between the base and emitter electrodes of transistor T1.

Consider run-mode operation of the switched mode power supply, after transient conditions occurring during startup have disappeared. During each cycle of the on-off switching of transistor T1, the high-level of switched control voltage 9 is level shifted by zener diode 10a and applied to the base of driver transistor T2 to turn on the transistor. Capacitor 10b becomes charged positive, left terminal to right terminal, in accordance with the zener voltage of diode 10a.

When transistor T2 turns on, collector current from the transistor is coupled to the base of transistor T1 to turn it on. Collector current for transistor T2 is initially supplied from a Vc supply voltage developed across a capacitor 30. After transistor T1 becomes conductive, collector current for transistor T2 is mainly supplied from a transformer secondary winding section 6a via a rectifier 19 and an impedance network 23, comprising an inductor 23a paralleled by a resistor 23b. A rectifier 24, having its anode coupled to the collector of transistor T2 and its cathode couled to capacitor 30 dampens voltage spikes at the collector of transistor T2 when the transistor is turned off.

When switching transistor T1 is made conductive, the +UB input supply voltage is developed across primary winding 2, with the undotted terminal of the primary winding being positive relative to the dotted terminal. Magnetic energy is stored in transformer T2 during the on-time of transistor T1 in the form of an upramping primary winding current. No energy is being transferred to secondary supply circuit 36 during the on-time of transistor T1 because the negative voltage at the dotted terminal of secondary winding 15 reverse biases rectifier 33.

To turn off switching transistor T1 and thus end the magnetic energy storage interval, control circuit 5 generates the low-level of switched control voltage 9. The low-level of control voltage 9 may be generated, for example, by a sink transistor internal to control circuit 5 which grounds terminal e via the collector-to-emitter path of the transistor. With the low-level of control voltage 9 being generated, the base-emitter junction of driver transistor T3 is rapidly forward biased and the base-emitter junction of driver transistor T2 is rapidly reverse biased, aided by the discharge of speedup capacitor 10b. Transistor T3 is rapidly switched into conduction and transistor T2 is rapidly switched into cutoff.

When transistor T3 becomes conductive, a negative bias voltage −Uv developed at a terminal h coupled to the collector of transistor T3, is applied as a reverse biasing voltage to the base-emitter junction of transistor T1. Negative bias voltage −Uv is generated across a filter capacitor 13 coupled between terminal h and ground by means of a bias voltage generator 37, in a manner to be described later.

The negative terminal of capacitor 13 at terminal h is coupled via the collector-to-emitter main current path of transistor T3 and via impedance network 4 to the base of switching transistor T1. The positive terminal of capacitor 13 is coupled to the emitter of transistor T1 via the low impedance path of sampling resistor 3 in parallel with capacitor 31, which are each of low impedance at the relatively high switching frequency of transistor T1.

When the negative bias voltage −Uv is applied to the base-emitter junction of switching transistor T1, a reverse base current flows into transistor T1 for a short interval to sweep out the stored charge in the base region of transistor T1 and to discharge the parasitic capacitors associated with the transistor. After a short turn-off delay interval, transistor T1 becomes cut off.

When transistor T1 becomes cutoff, a flyback interval commences where induced voltage pulses are generated in each winding of transformer T1 such that the dotted terminal of each winding is positive relative to the undotted terminal. The induced pulse voltage developed at secondary winding 15 forward biases rectifier 33 and recharges capacitor 34 to replenish the energy lost by the capacitor to load 35 during that portion of each switching cycle when rectifier 33 is blocked.

During the off-time of transistor 35, the stored magnetic energy in transformer Tr is discharged into the secondary side loads such as capacitor 34 and load circuit 35. This mode of operation, where energy is stored in the transformer during the on-time of transistor T1, and energy is discharged into the secondary side loads during the off-time of the transistor when the secondary side rectifiers are conducting, is known as a flyback converter mode of operation.

The switched mode power supply may also be operated on a discontinuous basis during the flyback converter mode of operation, where a deadtime interval exists within each cycle of switching operation when neither transistor T1 nor the secondary side rectifiers such as rectifier 33 is conductive, and transformer Tr remains in an energy discharged state.

During the flyback interval, when the dotted terminal of a secondary winding section 6b is positive, the voltage across the primary winding section is rectified by a rectifier 7 and filtered by capacitor 8 to developed a Vcc voltage at a voltage supply terminal c of control circuit 5 for supplying operating potential to the control circuit. Winding sections 6b and 6a form a tapped secondary winding 6 where the tap terminal of the secondary winding may be considered at the same AC potential as the ground connected terminal of capacitors 8, 13 and 30. This is so because the tap terminal is coupled to the capacitor terminals via the low impedance of sampling resistor R3 and filter capacitor 31.

To generate the negative bias voltage −Uv during run-mode operation, a rectifier 18 of bias voltage generator 37 is forward biased by the negative voltage developed at the undotted terminal of secondary winding section 6a during the flyback interval. Rectifier 18 rectifies the voltage developed across secondary winding section 6a during the flyback interval to develop the negative bias voltage −Uv across filter capacitor 13.

To regulate the secondary side operating voltages generated by transformer Tr, such as the +U0 operating voltage, a feedback voltage Ur is coupled to a voltage feedback input terminal d of control circuit 5. Feedback voltage Ur, generated by conventional circuitry not illustrated in the FIGURE, is representative of the level of operating voltage +U0. Pulse width modulating control circuitry within control circuit 5, also of conventional design, pulse width modulates switched control voltage 9 to vary the on-time of transistor T1 in a manner that stabilizes operating voltage +U0. For example, should operating voltage +U0 decrease, control circuit 5 increases the high-level to low-level duty cycle of control voltage 9 to increase the on-time of switching transistor T1. With the on-time of switching transistor T1 increased, more energy is stored in transformer Tr, and more energy is subsequently transferred to supply circuit 36 during the flyback interval to restore operating voltage +U0 to its stabilizing level.

Prior to startup of the switched mode power supply, on-off switch 22 is open, thereby disconnecting AC mains voltage UN from full-wave bridge rectifier 1. The various DC filter capacitors such as capacitors 8, 13, 30 and capacitor CL are in a discharged state. To start up operation of the switched mode power supply, on-off switch 22 is closed and filter capacitor CL is charged to an input voltage level +UB. Filter capacitor 8 is charged to a startup voltage level from AC mains voltage UN via a rectifier 27 and a resistor 28 that are coupled in series between AC mains voltage terminal 21 and control circuit supply terminal c. During the run-mode of operation, the full Vcc voltage level is developed across capacitor 8 by the rectified voltage from secondary winding section 6b. Filter capacitor 30 is charged to the Vc voltage level from AC mains voltage UN via rectifier 27 and a resistor 29 that is coupled to the cathode of the rectifier and to capacitor 30.

After the startup interval is initiated by the closing of on-off switch 22, a transient interval occurs where control circuit 5, although generating a switched control voltage at terminal e, is incapable of generating a control voltage that is adequate to safely provide on-off switching of output transistor T1. This transient interval arises due to the charging of initially uncharged filter capacitors within the switched mode power supply, such as filter capacitor CL which generates input supply voltage UB and filter capacitor 8 which generates the Vcc operating potential at terminal c for control circuit 5.

Without adequate Vcc supply voltage, control circuit 5 may not be able to build up control voltage 9 to its proper run-mode level. Additional capacitors within control circuit 5, used to generate the waveform of control voltage 9, may also require a transient interval to charge to their proper operating levels before a satisfactory control voltage may be developed. During this transient operating state, control circuit 5 may produce a hazardous situation where improper on-off switching of transistor T1 causes excessive transformer voltages and currents to be generated.

For example, during the startup interval, as supply voltage Vcc builds up, control circuit 5 may be capable of generating a control voltage 9 early in the startup interval that has a high-level amplitude great enough to make driver transistor T2 conductive. Output transistor T1 is then turned on to begin generating an upramping current in primary winding 2. Control circuit 5 them attempts to turn off transistor T1 by turning on the sink transistor within control circuit 5 that attempts to ground terminal e through the collector-to-emitter path of the sink transistor. However, the control circuit may not be able to keep the sink transistor saturated at the collector current levels needed to sink all the forward base current of driver transistor T3 that is needed to keep the transistor in conduction. Without driver transistor T3 adequately conducting, the base-emitter junction of output transistor T1 may not be adequately reverse biased for a rapid turnoff of the output transistor. Transistor T1 may conduct for a much greater interval during each cycle of control voltage 9 than is desirable, producing a greater than desirable amplitude to the upramping current in primary winding 2. In fact, under certain transient conditions, transistor T1 may still be conducting when the next high-level of control voltage 9 is generated, thereby keeping the transistor conducting for a complete cycle of the control voltage. Other transient conditions arising in control circuit 9 may also prevent driver transistor T3 from turning off transistor T1 at its proper time.

Additionally, since the run-mode negative bias voltage −Uv is not available during the startup interval, an inadequate negative bias voltage level may be generated during the startup interval, thereby preventing a rapid reverse biasing of transistor T1 when transistor T3 is made conductive.

In accordance with an aspect of the invention, bias voltage generator 37 includes circuitry that generates a bias voltage −Uv that is available immediately upon initiation of the startup interval. The startup bias voltage is available to inhibit conduction of output transistor T1 until sufficient time has elapsed to permit control circuit 5 to generate a control voltage that will be adequate to safely initiate the on-off switching of the output transistor.

To generate the full amplitude negative startup bias voltage −Uv, bias voltage generator 37 includes a zener diode Z1 having its cathode grounded at the bottom terminal of filter capacitor 13 and having its anode coupled to a terminal g. Terminal g is coupled to one side of the AC mains voltage via an RC network comprising a resistor 11 and capacitor 12 coupled in series between bridge rectifier input terminal f and bias voltage generator terminal g. Negative voltage pulses developed at terminal g are clipped by zener diode Z1 to the zener voltage level of e.g. −3.9 V. A diode D1, having its cathode coupled to terminal g and its anode coupled to terminal h, rectifies the negative, clipped pulses at terminal g to generate the mains derived negative startup bias voltage −Uv at a full amplitude level of −3.5 V.

To generate the negative voltage pulses at terminal g, capacitor 12 is charged positive, top terminal relative to bottom terminal, via zener diode Z1 and bridge rectifier diode 1d, during the half-cycle of AC main voltage UN when the voltage level at terminal 21 is positive relative to the voltage level at terminal 20. The positive voltage developed in capacitor 12 is then applied to the cathode of zener diode Z1 via the circuit path of bridge rectifier diode 1c, during the other half-cycle of AC mains voltage UN when terminal 20 is at a positive voltage level relative to the voltage level at terminal 21.

In carrying out an aspect of the invention, the negative startup bias voltage −Uv inhibits conduction of transistor T1 by immediately forward biasing driver transistor T3 into conduction upon initiation of the startup interval. The negative bias voltage is coupled to input terminal 32 of driver stage 25, at the junction of the bases of driver transistors T2 and T3, via a biasing resistor 14 coupled between terminal h and terminal 32. The negative startup bias voltage −Uv maintains transistor T2 in cutoff and transistor T3 in conduction, thereby inhibiting the turn-on of output transistor T1 during the startup interval.

Startup bias voltage −Uv is available at its full amplitude almost immediately upon initiation of the startup interval, much earlier than the slow buildup of control voltage 9. The immediate availability of negative bias voltage −Uv prevents the control voltage from overriding the inhibiting effects of the bias voltage until transient conditions within control circuit 5 have disappeared, and an adequate low-level state to control voltage 9 can be built up at terminal e to properly turn on transistor T3 and turn off transistor T2. As control voltage 9 slowly builds up, the first high-level pulse of control voltage 9, that is of large enough amplitude to overcome the startup negative bias voltage, turns on transistor T2. By that time, control circuit output terminal e is sufficiently conditioned to sink enough base current to turn on transistor T3 when the low-level of the control voltage is next generated. Normal on-off switching of output transistor T1 then commences.

We claim:

1. A switched mode power supply, comprising:
   a source of AC mains voltage;
   means coupled said source for generating an input supply voltage from said AC mains voltage;
   an inductance;
   an output switch coupled to said inductance and to said input supply voltage;
   a driver stage coupled to said output switch and to a switched control voltage for producing on-off switching of said output switch between conduction and cutoff to generate a pulse voltage in said inductance;
   a supply circuit including a rectifier coupled to said pulse voltage for generating an operating voltage;
   a control circuit for generating said control voltage, said control circuit being responsive to a feedback signal that is representative of said output voltage for modulating said control voltage in a manner that enables said driver stage to vary the switching of said output switch to stabilize said operating voltage; and
   means for generating a bias voltage available during a start-up interval that is initiated prior to a run-mode switching operation of said switched mode power supply,
   said bias voltage being coupled to said driver stage during said start-up interval to inhibit conduction of said output switch during the start-up interval until sufficient time has elapsed after initiation of said start-up interval to enable said control circuit to generate a control voltage that is adequate to safely initiate said on-off switching.

2. A power supply according to claim 1 wherein prior to elapse of said sufficient time both said bias voltage and said control voltage are being generated, and wherein said bias voltage inhibits conduction of said output switch until said control circuit is capable of generating a control voltage that is adequate to safely initiate said on-off switching.

3. A power supply according to claim 1 wherein said bias voltage generating means includes means for generating said bias voltage during said start-up interval by rectification of said AC mains voltage.

4. A power supply according to claim 1 wherein said bias voltage generating means includes a second rectifier coupled to said AC mains voltage for generating said bias voltage by rectification thereof.

5. A power supply according to claim 4 wherein said bias voltage generating means includes an RC network coupled to said second rectifier for generating said bias voltage from current that flows through said rectifier via said RC network to a bias terminal, at which terminal said bias voltage is generated.

6. A power supply according to claim 5 including a zener diode coupled to said bias terminal for regulating said bias voltage.

7. A power supply according to claim 6 wherein said second rectifier is part of a full-wave bridge rectifier, where said AC mains voltage is coupled between two input terminals of said bridge rectifier and said input supply voltage is generated between two output terminals thereof, and wherein a resistor and a capacitor of said RC network are coupled with said zener diode in a series relationship between an input terminal and a corresponding output terminal of said bridge rectifier that are directly coupled to respective electrodes of said second rectifier.

8. A power supply according to claim 7 wherein said bias voltage generating means includes means including a rectifying and filtering circuit responsive to said inductance pulse voltage for generating said bias voltage during said run-mode switching operation.

9. A power supply according to claim 1 wherein said driver stage includes a driver switch having a control input coupled to said control voltage and to said bias voltage for switching said driver switch between conduction and cutoff by said control voltage in accordance with a bias applied by said bias voltage to said driver switch control input.

10. A power supply according to claim 9 wherein prior to elapse of said sufficient time, both said bias voltage and said control voltage are coupled to said driver switch control input such that the bias applied thereto by said bias voltage prevents said control voltage from switching said driver switch between conduction and cutoff until elapse of said sufficient time in order to inhibit conduction of said output switch.

11. A power supply according to claim 10 wherein said driver switch has a main current path coupled to said bias voltage and to a control input of said output switch for applying said bias voltage to said control input of said output switch for inhibiting conduction thereof during said start-up interval until said sufficient time has elapsed.

12. A power supply according to claim 11 wherein said main current path of said driver switch applies said bias voltage to the output switch control input during said run-mode of operation for switching the output switch into nonconduction during each cycle of said on-off switching.

13. A power supply according to claim 1 wherein said driver stage includes first and second driver switches having their main current paths coupled together and each having a control input coupled to said control voltage and to said bias voltage for alternately switching the two driver switches between conduction and cutoff by said control voltage in accordance with biases applied by said bias voltage to the control inputs of the two driver switches.

14. A power supply according to claim 13 wherein prior to elapse of said sufficient time, both said bias voltage and said control voltage are coupled to the two driver switch control inputs such that the bias applied thereto by said bias voltage prevents said control voltage from switching said first driver switch into conduction until elapse of said sufficient time.

15. A power supply according to claim 14 wherein said bias voltage prevents said control voltage from switching said second driver switch into cutoff until elapse of said sufficient time.

16. A power supply according to claim 13 wherein the main current paths of the two driver switches are coupled together at a control input terminal of said output switch and said bias voltage is coupled to the main current path of said first driver switch at a point remote from said output switch control input terminal, said first driver switch when conducting applying said bias voltage to said output switch control terminal for reverse biasing said output switch, said second driver switch when conducting applying a second voltage to said output switch control terminal for forward biasing said output switch.

17. A power supply according to claim 16 wherein prior to elapse of said sufficient time, both said bias voltage and said control voltage are coupled to said driver switch control input such that the bias applied thereto by said bias voltage prevents said control voltage from switching each of the two driver switches between conduction and cutoff until elapse of said sufficient time for inhibiting conduction of said output switch until said sufficient time has elapsed.

18. A power supply according to claim 1 wherein said inductance comprises a transformer having a first winding coupled to said output switch and a second winding coupled to said supply circuit.

19. A power supply according to claim 18 wherein said rectifier becomes conductive when said output switch is made nonconductive in a flyback converter mode of operation.

* * * * *